3,325,531
PROCESS FOR THE MANUFACTURE OF
ADIPONITRILE
Joseph Glendinning Mather and Richard Anthony Williams, Manchester, England, assignors to Imperial Chemical Industries Limited, London, England, a corporation of Great Britain
No Drawing. Filed July 9, 1964, Ser. No. 381,521
Claims priority, application Great Britain, July 15, 1963, 27,931/63
4 Claims. (Cl. 260—465.2)

This invention relates to a process for the manufacture of adiponitrile from adipic acid and ammonia.

It has already been proposed to manufacture adiponitrile by contacting adipic acid in the vapour phase with ammonia gas at high temperature in presence of a catalyst, and various forms of apparatus for conducting this operation have been proposed. However, not all the prior methods for the manufacture of adiponitrile have been entirely satisfactory. Thus for example certain of these methods have required the use of relatively complicated mixing and heating arrangements for the reactants, and there has been considerable decomposition of adipic acid with accompanying formation of undesired by-products.

According to the present invention we provide a process for the manufacture of adiponitrile by reacting adipic acid in the vapour phase with gaseous ammonia in presence of a catalyst characterised in that the adipic acid is introduced in the molten condition into the ammonia gas stream and in that the heat required to convert substantially all the adipic acid so introduced from the molten condition to the vapour state at the desired rate is supplied by the ammonia gas stream.

In the process of the invention molten adipic acid is introduced into a superheated stream of ammonia gas moving at high velocity and in a state of extreme turbulence. The ammonia stream completely volatilises the molten adipic acid usually in 0.01 seconds or less. The mixture of ammonia gas and adipic acid may or may not be further heated before being introduced into the chamber containing the catalyst. If further heating of the mixed ammonia gas and adipic acid vapour is desired a suitable method of heating is provided by a tubular heater which may or may not be packed with inert material such as ceramic packing through which the vapours may be passed.

The molten acid at a temperature of from 160° C. to 270° C. may be fed into a pipe or chamber through which ammonia gas at an inlet temperature of from 450° C. to 550° C. and an outlet temperature from 270° C. to 320° C. is passing at high velocity. Particularly suitable space velocities are for example from 100 to 200. The term "space velocity" is used here to mean the volume of the gases and vapour passing per second divided by the volume of the pipe or chamber. At these space velocities and temperatures the turbulence of the ammonia stream is sufficient to atomise the molten adipic acid which almost immediately vaporises. The feed pipe for the adipic acid can be of very simple design, and may have a single or a multiple opening into the pipe or chamber through which the ammonia gas stream is passed. It is advantageous if the pipe through which the ammonia is passed has a narrowed bore at the point of entry of the molten adipic acid in order to induce greater turbulence in the flow of ammonia gas. The molten adipic acid is under sufficient pressure to overcome the pressure set up by the ammonia flow, and may be introduced into the ammonia stream either in the same direction as the direction of travel of the ammonia stream or in any other direction which may be desired.

Using the present process of adiponitrile manufacture it is found that the yield of adiponitrile is good and the formation of by-products is small.

The invention is illustrated but not limited by the following example.

*Example*

Molten adipic acid at a temperature of 180° C. was injected at a rate of 1200 lb. per hour through a pipe of ¼ inch internal diameter into a stream of ammonia heated to a temperature of 500° C. and flowing at a rate of 1800 lb. per hour through a pipe initially having an internal diameter of 3 inches but narrowing to 2 inches internal diameter at the point of injection of the molten adipic acid. The adipic acid was atomised in the turbulent ammonia stream and vapourised by the sensible heat of the ammonia gas. By using a pipe for the passage of the ammonia having a narrowed bore at the point of entry of the molten adipic acid greater turbulence in the gas flow was induced and this was found to aid vapourisation of the adipic acid.

The reactant gases were introduced into the converter containing catalyst at a temperature of 290° C.

A high yield of adiponitrile was obtained, 93–95% of the adipic acid being converted to adiponitrile.

A typical analysis was:

| | |
|---|---|
| Adiponitrile | 94.5 |
| Cyanocyclopentylideneimine | 1.7 |
| Composition of product (mol. percent) | |
|     Degradation products | 2.0 |
|     High boiling materials | 1.8 |

What we claim is:

1. Process for manufacture of adiponitrile by reacting adipic acid in the vapor phase with gaseous ammonia in the presence of a catalyst, characterized in that adipic acid in molten condition is introduced into a superheated ammonia gas stream moving at a space velocity of 100 to 200 per second and in that the heat required to convert substantially all the adipic acid so introduced from the molten condition to the vapor state is supplied by direct contact with the said ammonia gas stream.

2. Process according to claim 1 wherein molten adipic acid is introduced at such a rate that it is volatilized in not more than 0.01 second.

3. Process according to claim 1 when carried out by introducing molten adipic acid at a temperature of 160° to 270° C. into a pipe or chamber through which the ammonia gas stream is passing at an inlet temperature of 450° to 550° C. and an outlet temperature of 270° to 320° C.

4. Process according to claim 3 wherein molten adipic acid is introduced at such a rate that it is volatilized in not more than 0.01 second.

References Cited

UNITED STATES PATENTS 2,955,130   10/1960   Guyer et al.    260—465.2
3,153,084   10/1964   Veazey et al.    260—465.2

CHARLES B. PARKER, *Primary Examiner.*

JOSEPH P. BRUST, *Examiner.*